(12) United States Patent
Choi

(10) Patent No.: US 6,839,228 B2
(45) Date of Patent: Jan. 4, 2005

(54) PORTABLE COMPUTER APPARATUS AND MANUFACTURING METHOD THEREOF

(75) Inventor: Phil-Kyu Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 09/953,904

(22) Filed: Sep. 18, 2001

(65) Prior Publication Data

US 2002/0085346 A1 Jul. 4, 2002

(30) Foreign Application Priority Data

Jan. 4, 2001 (KR) .......................................... 2001/452

(51) Int. Cl.[7] ................................................ G06F 1/16
(52) U.S. Cl. ...................... 361/685; 361/686; 361/731; 710/303; 312/223.2
(58) Field of Search ................................ 361/681, 683, 361/685, 686, 724, 727, 730, 737, 979, 797; 439/353; 395/281, 282; 710/303, 304; 312/223.2; 493/353

(56) References Cited

U.S. PATENT DOCUMENTS

| | | | | |
|---|---|---|---|---|
| 5,472,351 A | * | 12/1995 | Greco et al. ................. | 439/353 |
| 5,995,365 A | * | 11/1999 | Broder et al. ................ | 361/685 |
| 6,101,088 A | * | 8/2000 | Nakajima et al. ........... | 361/686 |
| 6,456,491 B1 | * | 9/2002 | Flannery et al. ............. | 361/685 |

FOREIGN PATENT DOCUMENTS

| | | |
|---|---|---|
| JP | 08-031509 | 2/1996 |
| JP | 09-330143 | 12/1997 |
| JP | 11-134063 | 5/1999 |

* cited by examiner

*Primary Examiner*—Darren Schuberg
*Assistant Examiner*—Anthony Q. Edwards
(74) *Attorney, Agent, or Firm*—Robert E. Bushnell, Esq.

(57) ABSTRACT

A portable computer is disclosed having a casing formed with a hard disk drive accommodating part, a main board accommodated in the casing, a hard disk drive connector electrically connected with the main board in the hard disk drive accommodating part, a hard disk drive assembly having a connecting pin part sliding into the hard disk drive accommodating part to detachably engage with the hard disk drive connector, and a location guide part having a guide projection and an accommodating guide. The guide projection is provided at either the hard disk drive assembly or the hard disk drive accommodating part. The accommodating guide engages with the guide projection when the hard disk drive assembly is slid into the hard disk drive accommodating part. The disclosed portable computer allows for a connector pin part of a hard disk drive to accurately engage with a hard disk drive connector of a hard disk drive accommodating part to prevent damage of the connector pin part.

14 Claims, 9 Drawing Sheets

PORTABLE COMPUTER APPARATUS AND MANUFACTURING METHOD THEREOF

CLAIM OF PRIORITY

This application makes reference to, incorporates the same herein, and claims all benefits accruing under 35 U.S.C. §119 from my application NOTEBOOK COMPUTER filed with the Korean Industrial Property Office on 4 Jan. 2001 and there duly assigned Serial No. 452-2001.

BACKGROUND OF THE INVENTION

1. Technical Field

The present invention relates to a portable computer such as a notebook computer, and more particularly, to a portable computer having an improved detachable construction of a hard disk drive (HDD) assembly.

2. Related Art

A computer system can be a desktop computer, a personal computer, a portable computer such as a notebook computer or palm-sized computer, or other type of computer. Portable computers are often referred to as laptop, notebook, subnotebook, or palm-sized computers. The size of portable computers is becoming much smaller than the size of desktop computers, so that a portable computer can be very convenient to carry, manage, and use.

The performance of the portable computers has been improved to the point where it is comparable to the performance of the desktop computer. For these reasons and others, a demand for portable computers is being increased. To satisfy users and to meet this demand, portable computers are becoming smaller and lighter, and various functions for users are being developed.

I have found that components in a portable computer can become damaged when they are removed and replaced, during an upgrading of the portable computer for example. It is extremely inconvenient when components in a portable computer get damaged.

SUMMARY OF THE INVENTION

An object of the present invention is to provide a portable computer accurately engaging a connector pin pail of a hard disk drive (HDD) with a hard disk drive connector of a hard disk drive accommodating part to prevent damage of the connector pin part, thereby reducing the cost of production and assembling steps.

The purpose is achieved by a portable computer comprising a casing formed with a hard disk drive accommodating part, a main board accommodated in the casing, a hard disk drive connector electrically connected with the main board in the hard disk drive accommodating part, a hard disk drive assembly having a connecting pin part sliding into the inside of the hard disk drive accommodating part to detachably engage with the hard disk drive computer, and a location guide part having a guide projection provided at any one of the hard disk drive assembly and the hard disk drive accommodating part and an accommodating guide engaging with the guide projection when the hard disk drive assembly is slid into the hard disk drive accommodating part.

A portable computer is provided which is capable of making the connector pin part of the hard disk drive and hard disk drive connector engage each other, to prevent damage of the connector pin part, thereby reducing the assembling steps and the cost of production.

Herein, to engage the hard disk drive connector with connector pin part more accurately, it is recommended that the location guide part be provided adjacent to the hard disk drive connector and the connector pin part corresponding to the hard disk drive connector. The accommodating guide is provided at the hard disk drive assembly, and the said guide projection is provided at the hard disk drive accommodating part.

The hard disk drive assembly has a hard disk drive storing data therein and a hard disk drive support coupled along the circumference of the hard disk drive, and the said accommodating guide is formed integrally to the hard disk drive support.

To achieve these and other objects in accordance with the principles of the present invention, as embodied and broadly described, the present invention provides a portable computer apparatus, comprising: a casing being formed to include a hard disk drive accommodating unit; a main board being accommodated in said casing; a hard disk drive connector being electrically connected to said main board at said hard disk drive accommodating unit; a hard disk drive assembly unit including a connecting pin part detachably engaging with said hard disk drive connector at said hard disk drive accommodating unit when said hard disk drive assembly unit engages said hard disk drive accommodating unit; and a location guide part, comprising: a guide projection; and an accommodating guide, said guide projection being provided at one unit selected from among said hard disk drive assembly unit and said hard disk drive accommodating unit, said accommodating guide being provided at said hard disk drive assembly unit when said guide projection is provided at said hard disk drive accommodating unit, said accommodating guide being provided at said hard disk drive accommodating unit when said guide projection is provided at said hard disk drive assembly unit, said accommodating guide engaging with said guide projection when said hard disk drive assembly unit engages said hard disk drive accommodating part.

To achieve these and other objects in accordance with the principles of the present invention, as embodied and broadly described, the present invention provides an apparatus, comprising: a casing being formed to include an accommodating unit; a main board being accommodated in said casing; a connector being electrically connected to said main board at said accommodating unit; an assembly unit including a connecting pin part detachably engaging with said connector at said accommodating unit when said assembly unit engages said accommodating unit; a guide projection; and an accommodating guide, said guide projection being provided at one unit selected from among said assembly unit and said accommodating unit, said accommodating guide being provided at said assembly unit when said guide projection is provided at said accommodating unit, said accommodating guide being provided at said accommodating unit when said guide projection is provided at said assembly unit, said accommodating guide engaging with said guide projection when said assembly unit engages said accommodating part.

To achieve these and other objects in accordance with the principles of the present invention, as embodied and broadly described, the present invention provides a method, comprising: inserting an assembly unit into an accommodating unit formed by a casing, said assembly unit including a connecting pin part, said accommodating unit including a connector electrically connected to a main board accommodated in said casing; when said inserting is performed, engaging a guide projection with an accommodating guide, said guide projection being provided at one unit selected from among said assembly unit and said accommodating unit, said accommodating guide being provided at said assembly unit when said guide projection is provided at said accommodating unit, said accommodating guide being provided at said accommodating unit when said guide projection is provided at said assembly unit, said accommodating guide being engaged with said guide projection when said assembly unit is inserted into said accommodating part; and engaging said connecting pin part with said connector after said engaging of said guide projection with said accommodating guide.

The present invention is more specifically described in the following paragraphs by reference to the drawings attached only by way of example. Other advantages and features will become apparent from the following description and from the claims.

BRIEF DESCRIPTION OF HE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

In view of the need for an efficient management of data and a future system upgrade, a portable computer can have a hard disk drive detachably mounted to a main body of the portable computer.

Figure 6:
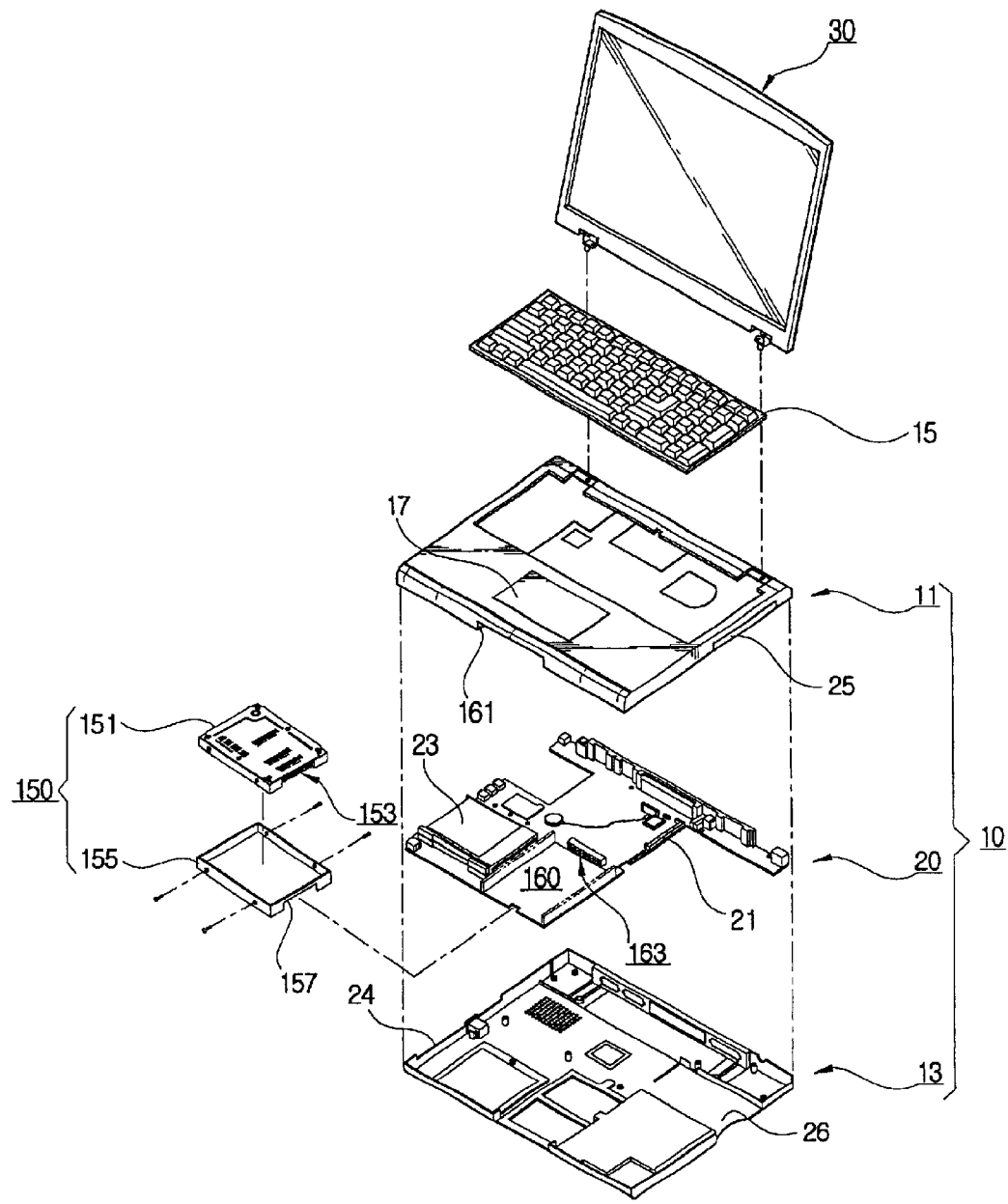
FIG. 6 is an exploded view of a portable computer having a detachable hard disk drive.

FIG. 6 is an exploded perspective view of a portable computer having a detachable hard disk drive. As shown in FIG. 6, the portable computer has a main body 10 and a display assembly 30 hinge-coupled to the top of the main body 10.

The main body 10 has a top casing 11 and a bottom casing 13 forming a space for accommodating various components. In the space between the top and bottom cases 11 and 13, there is installed a main board 20 with a central processing unit (CPU), a random access memory (RAM), and other components. The main board 20 comprises a drive connector 21 for connecting detachable disk drives such as a floppy disk drive (FDD) or a compact disc-read only memory (CD-ROM) drive, and a PCMCIA slot 23 for installing a PCMCIA card. A PCMCIA card is a card conforming to standards of the Personal Computer Memory Card International Association.

A drive inserting bay 25 for inserting the detachable disk drive is formed at one side of the top casing 11, corresponding to the drive connector 21, and a drive accommodating space 26 is formed at the bottom casing 13 between the drive inserting bay 25 and the drive connector 21. A card inserting bay 24 for inserting the PCMCIA card is formed at the other side of the bottom casing 13 corresponding to the PCMCIA slot 23.

Figure 7:
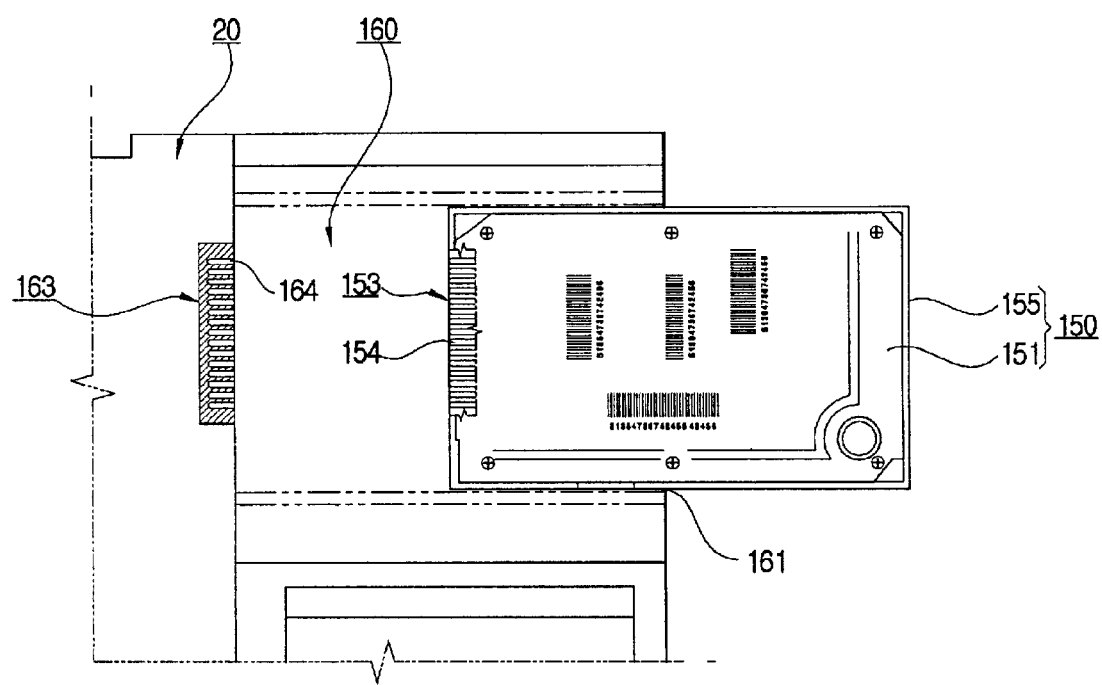
FIG. 7 is a sectional view of an installing area of the hard disk drive assembly of FIG. 6.

FIG. 7 is a top plan view of an installing area of a hard disk drive assembly. As shown in FIGS. 6 and 7, a hard disk drive assembly 150 has a hard disk drive 151 in which data are stored and a hard disk drive support 155 which supports the hard disk drive 151.

In the rear of the hard disk drive 151, there is a connecting pin part 153 allowing data to be transmitted to and from the main board 20, wherein a plurality of pins 154 are arranged. The hard disk drive (HDD) support 155 is in a rectangular shape to surround the edges of the hard disk drive 151. In the rear of the hard disk drive support 155, there is a connector exposing bay 157 to expose the connecting pin part 153 of the hard disk drive 151.

In a front part of the main board 20, there is a hard disk drive accommodating part 160 making the hard disk drive assembly 150 slide thereinto. In the front of the top casing 11 corresponding to the hard disk drive accommodating part 160, there is a hard disk drive entering opening 161 through which the hard disk drive assembly 150 enters the hard disk drive accommodating part 160.

In the rear of the hard disk drive accommodating part 160, there is a hard disk drive connector 163 engaging with the connector pin part 153 of the hard disk drive 151. In the front of the hard disk drive connector 163, there are a plurality of pin holes 164 into which the pins 154 of the connecting pin part 153 are inserted.

With this configuration, when the hard disk drive assembly 150 is slid into the hard disk drive accommodating part 160, the connector pin part 153 of the hard disk drive 151 is engaged with the hard disk drive connector 163 of the hard disk drive accommodating part 160. Thus, the hard disk drive 151 can transmit data to and receive from the main board 20.

To separate the hard disk drive assembly 150 from the main body 10 is accomplished by the steps of pulling the hard disk drive assembly 150 from the hard disk drive accommodating part 160 so that the connector pin part 153 of the hard disk drive 151 is disengaged out of the hard disk drive connector 163 of the hard disk drive accommodating part 160, and then the hard disk drive assembly 150 is released from the hard disk drive accommodating part 160.

However, the portable computer shown in FIGS. 6 and 7 has the following problems. Because there is a certain gap between the hard disk drive assembly 150 and the hard disk drive accommodating part 160 to make the hard disk drive assembly 150 slide smoothly into the inside of the hard disk drive accommodating part 160, when the hard disk drive assembly 150 is inserted into the hard disk drive accommodating part 160, the hard disk drive assembly 150 is unstable due to the gap so that the engagement points of the connector pin part 153 and the hard disk drive connector 163 is out of place.

Further, where the engagement points of the connector pin part 153 and the hard disk drive connector 163 is not in place, if the hard disk drive assembly 150 is slid forcibly, the pins of the connector pin part 153 becomes bent or damaged.

Figure 8:
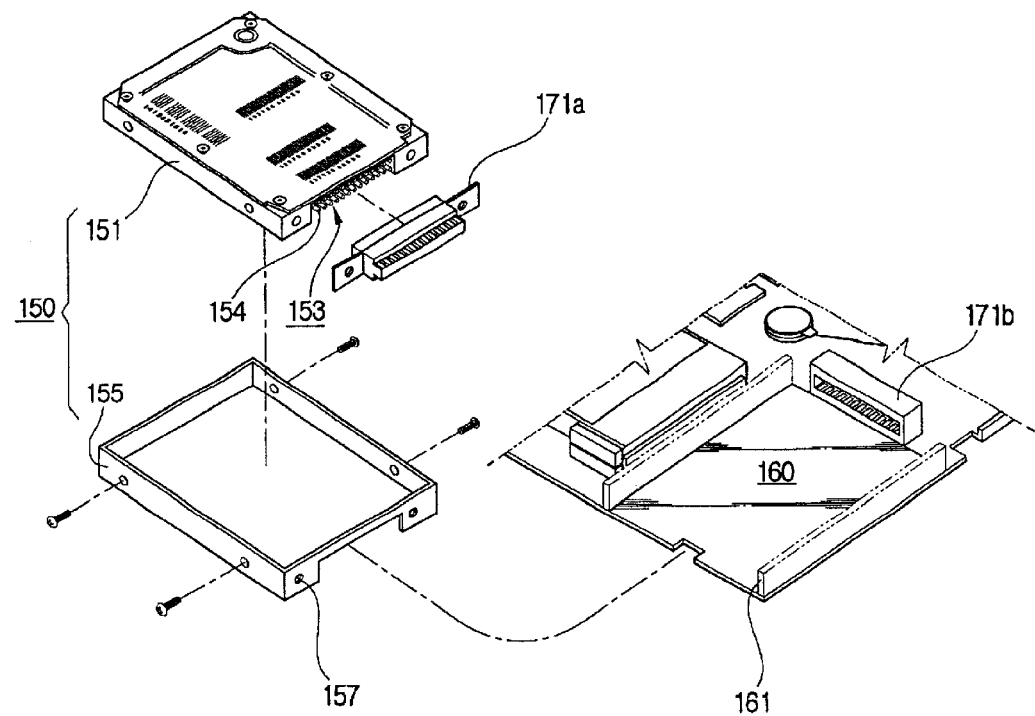
FIG. 8 and FIG. 9 are enlarged perspective views of installing areas of the hard disk drive assembly using interface connectors.
Figure 9:
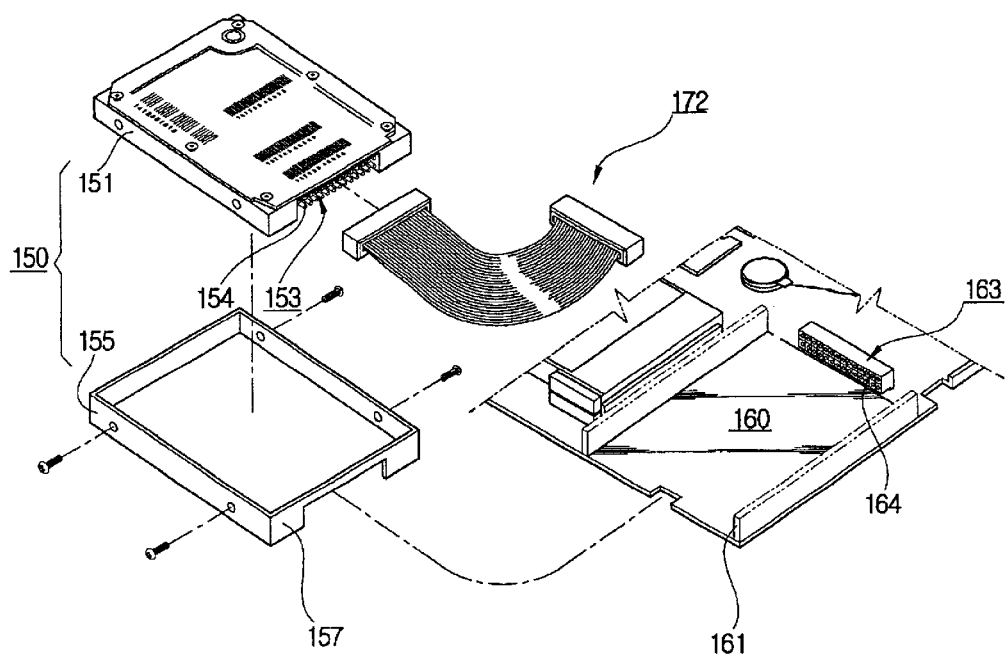

To overcome these problems, as shown in FIG. 8, there may be used separate slot type interface connectors 171*a* and 171*b* engaging with the hard disk drive connector and the hard disk drive connector pin part of the hard disk drive accommodating part, or as shown in FIG. 9, there may be used a cable type interface connector 172 connecting the hard disk drive connector pin part with the hard disk drive connector. However, the separate interface connectors and cable and other components makes the assembling steps complicated and increases the cost of production.

The preferred embodiments of the present invention will be described in more detail with reference to the accompanying drawings.

Figure 1:
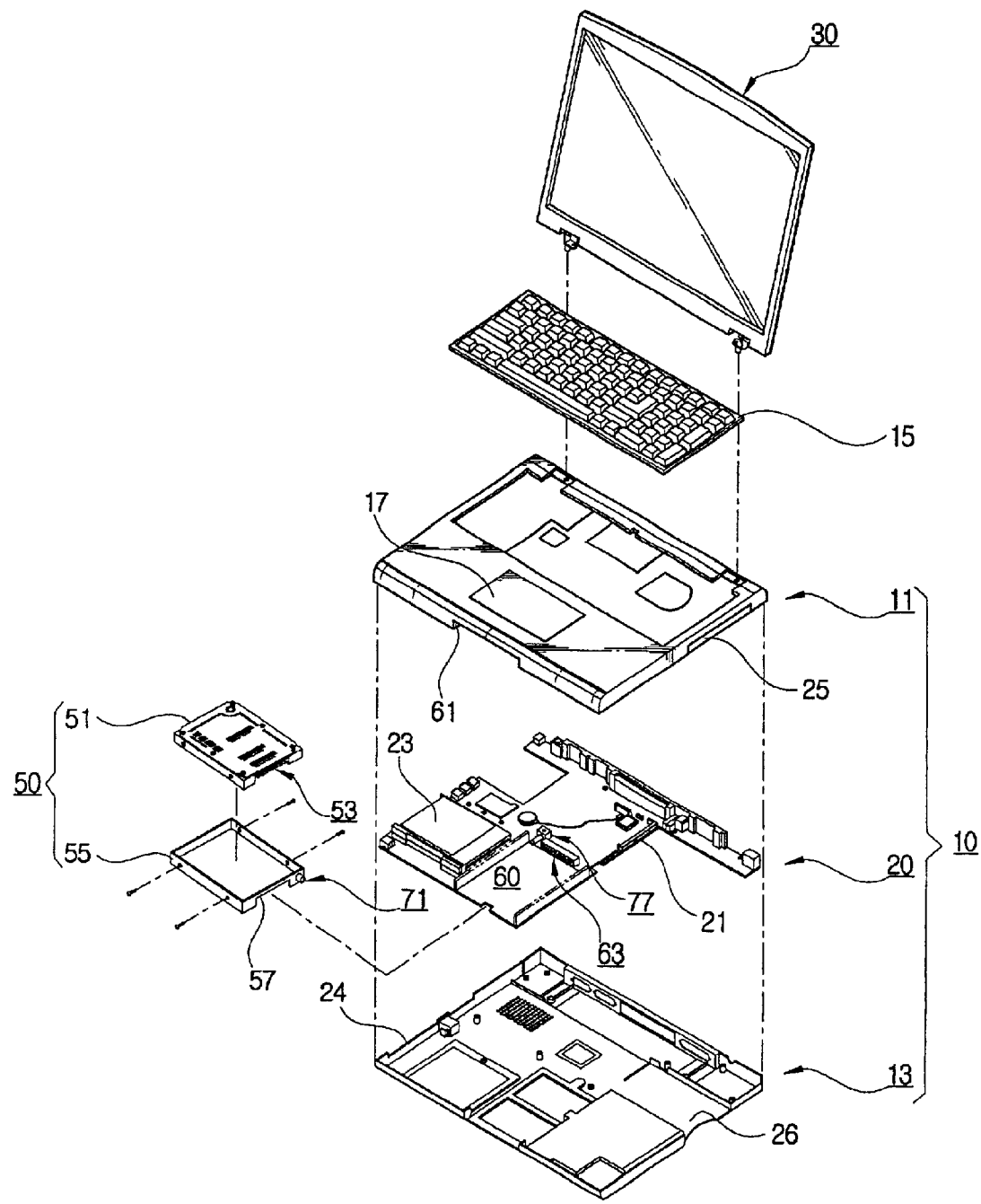
FIG. 1 is an exploded perspective view of a portable computer having a detachable hard disk drive, in accordance with the principles of the present invention.
Figure 2:
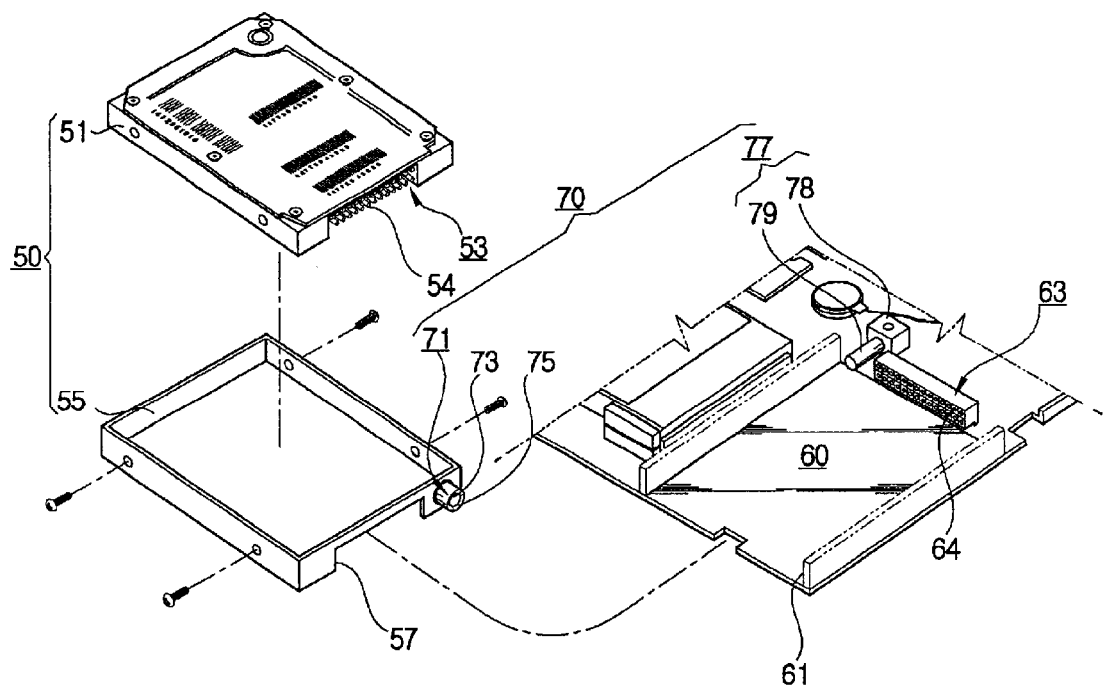
FIG. 2 is an enlargement perspective view of an installing area of the hard disk drive assembly of FIG. 1, in accordance with the principles of the present invention.

FIG. 1 is an exploded perspective view of a portable computer having a detachable hard disk drive according to the present invention, and FIG. 2 is an enlarged perspective view of an installing area of the hard disk drive assembly of FIG. 1. As shown in FIGS. 1 and 2, a general construction of the portable computer according to the present invention is almost the same as that of the above-described portable computer shown in FIGS. 6 and 7, except for a detachable construction of a hard disk drive assembly 50.

Therefore, the description for the general construction of the portable computer shown in FIGS. 6 and 7 will be incorporated herein, and the peculiar construction of the hard disk drive assembly 50 and a hard disk drive accommodating part 60 and the detachable construction of the hard disk drive assembly 50 will be mainly described hereinbelow. Like reference numerals denote like components, in both the portable computer shown in FIGS. 6 and 7, and the portable computer according to the present invention.

The hard disk drive assembly 50 of the portable computer according to the present invention has a hard disk drive 51 storing data therein and a hard disk drive support 55 supporting the hard disk drive 51, as shown in FIGS. 1 and 2. The hard disk drive 51 includes a storage area storing information, and includes a body. The storage area is mounted onto the body of the hard disk drive 51. The connecting pin part 53 is mounted onto the body of the hard disk drive 51.

In the rear of the hard disk drive (HDD) 51, there is provided a connecting pin part 53 allowing data to be transmitted to and from a main board 20, wherein plurality of pins 54 are arranged with a predetermined interval.

The hard disk drive support 55 is in a rectangular shape to surround the edges of the hard disk drive 51. In the rear of the hard disk drive support 55, there is provided a connector exposing bay 57 to expose the connecting pin part 53 of the hard disk drive 51.

In the front part of the main board 20, there is provided a hard disk drive accommodating part 60 making the hard disk drive assembly 50 to slide thereinto. In the front of the top casing 11 corresponding to the hard disk drive accommodating part 60, there is formed a hard disk drive entering opening 61 through which the hard disk drive assembly 50 can be inserted into the hard disk drive accommodating part 60.

In the rear of the hard disk drive accommodating part 60, there is provided a hard disk drive connector 63 engaging with the connector pin part 53 of the hard disk drive 51. In the front of the hard disk drive connector 63, there are formed a plurality of pin holes 64 into which the pins 54 of the connecting pin part 53 are inserted. The hard disk drive accommodating part 60 can be referred to as a hard disk drive accommodating region 60 or as a hard disk drive accommodating unit 60. The hard disk drive assembly 50 can be referred to as a hard disk drive assembly unit 50. The hard disk drive assembly 150 can be referred to as a hard disk drive assembly unit 150. The hard disk drive accommodating part 160 can be referred to as a hard disk drive accommodating unit 160.

The portable computer according to the present invention comprises a location guide part 70 guiding the engagement position of the connector pin part 53 of the hard disk drive 51 and the hard disk drive connector 63 of the hard disk drive accommodating part 60 when the hard disk drive assembly 50 is slid into the hard disk drive accommodating part 60.

The location guide part 70 comprises an accommodating guide 71 formed in a rear part of the hard disk drive assembly 50 and a guide projection 77 formed in the rear of the inside of the hard disk drive accommodating part 60 and inserting into the accommodating guide 71.

The accommodating guide 71 is integrally formed on the hard disk drive support 55 being adjacent to the connector exposing bay 57 of the hard disk drive support 55 and has an accommodating hole 73 into which the guide projection 77 is inserted.

The guide projection 77 is placed inside of the hard disk drive accommodating part 60 to correspond to the accommodating guide 71, being adjacent to the hard disk drive connector 63. The guide projection 77 comprises a fixing part 78 fixed inside of the hard disk drive accommodating part 60 and a projection part 79 which is projected from the fixing part 78 to the hard disk drive entering opening 61 and inserted into the accommodating hole 73 of the accommodating guide 71. The end of the accommodating hole 73 is preferably formed with an inclined surface 75 so that the projection part 79 can be inserted smoothly.

The guide projection 77, as shown in FIG. 2, may be coupled to the main board 20 being adjacent to the hard disk drive connector 63 by using screws or etc. and may be formed integrally with an inner surface of the hard disk drive accommodating part 60.

Figure 3:
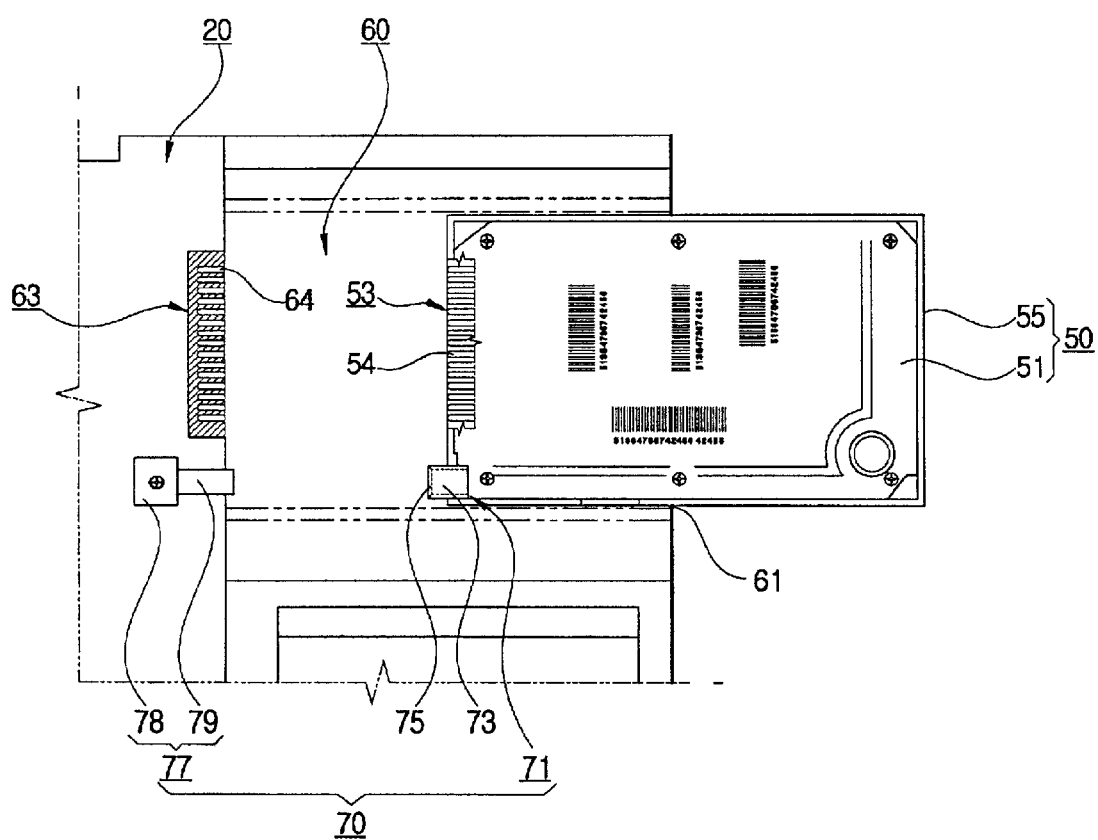
FIG. 3 to FIG. 5 are sectional views of FIG. 2, showing the assembling/disassembling steps of the hard disk drive assembly, in accordance with the principles of the present invention.
Figure 4:
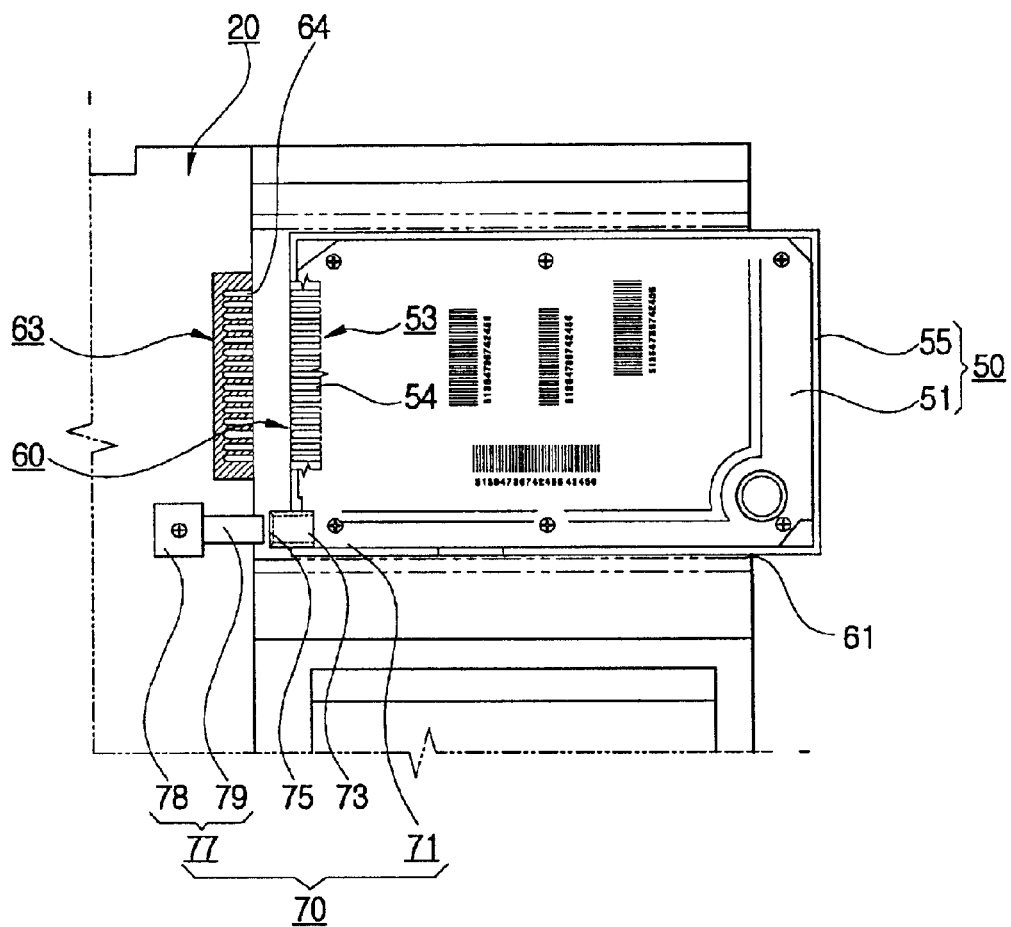

With this configuration, when the hard disk drive assembly 50 is inserted into the hard disk drive accommodating part 60 as shown in FIG. 3, the projection part 79 of the guide projection 77, which is formed in the hard disk drive accommodating part 60 contacts firstly the accommodating guide 71 formed in the rear of the hard disk drive assembly 50 as shown in FIG. 4. As the projection part 79 of the guide projection 77 is inserted into the accommodating hole 73 of the accommodating guide 71, the engagement position of the connector pin part 53 and the hard disk drive connector 63 is set-up.

Figure 5:
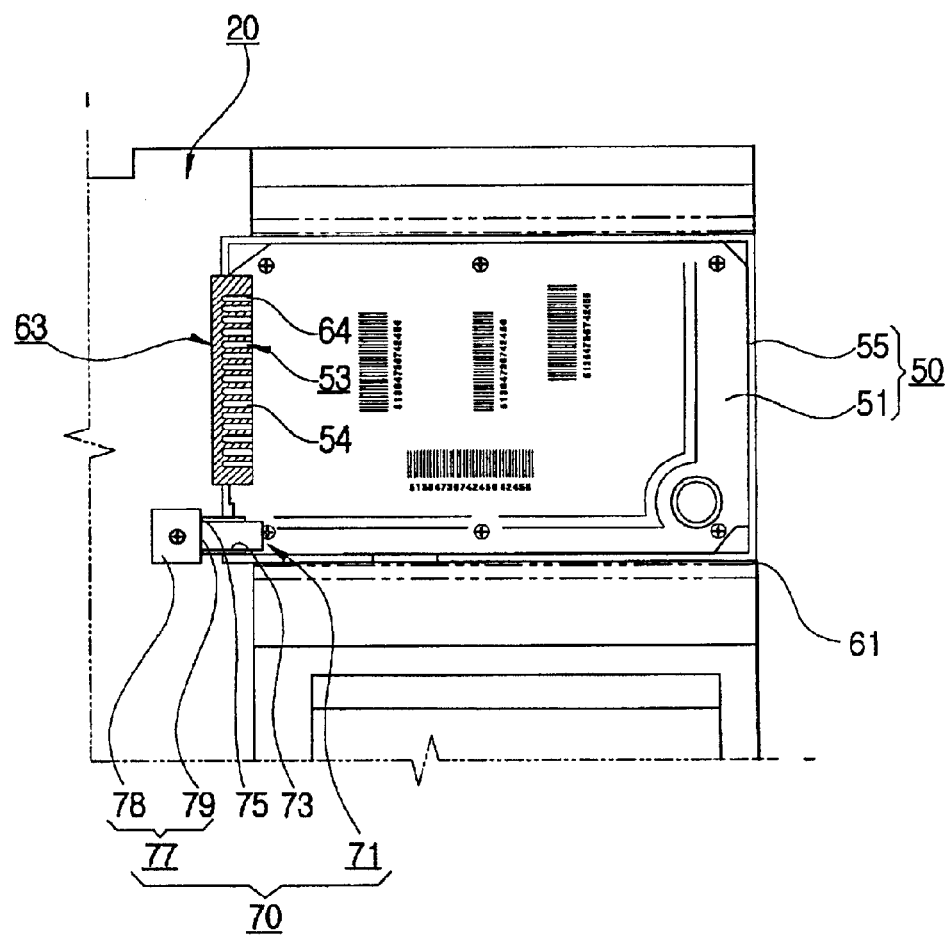

Then, when the hard disk drive assembly 50 is slid in, the set-up connector pin part 53 and the hard disk drive connector 63 are aligned and are engaged to each other accurately as shown in FIG. 5. Thus, the hard disk drive 51 is connected to the main board 20 to transmit data therebetween.

To separate the hard disk drive assembly 50 from the main body 10, the hard disk drive assembly 50 is firstly pulled out of the hard disk drive accommodating part 60. Then, as the engagement of the connector pin part 53 and the hard disk drive connector 63 is released, the accommodating guide 71 and the projection part 79 of the guide projection 77 are separated. Thus the hard disk drive assembly 50 is released from the hard disk drive accommodating part 60, and is separated from the main body 10.

As described above, when the hard disk drive assembly 50 is slid into the hard disk drive accommodating part 60, the engagement position of the connector pin part 53 and the hard disk drive connector 63 is set up accurately by the location guide part 70 which sets up firstly the engagement position of the connector pin part 53 and the hard disk drive connector 63. Therefore, damage of the connector pin part 53 is prevented efficiently without using other additional components such as interface connectors and cables.

In the above embodiment, the accommodating guide 71 and the guide projection 77 of the location guide part 70 are singularly formed in the respective hard disk drive assembly 50 and the hard disk drive accommodating part 60. However, it is also possible that the accommodating guide 71 is formed in the hard disk drive accommodating part 60, and the guide projection 77 is formed in the hard disk drive assembly 50. Further, two location guide parts, or more location guide parts, may be provided. The positions of the hard disk drive assemblies and the hard disk drive accommodating parts may be reversed, or interchanged.

As described above, the present invention presents a portable computer which is capable of making the connector pin part of the hard disk drive and the hard disk drive connector engage each other, to prevent damage of the connector pin part, thereby reducing the assembling steps and the cost of production.

The advantageous, convenient, and efficient alignment features of the present invention include the accommodating guide 71 and guide projection 77, as well as the other components related to the location guide part 70, in accordance with the principles of the present invention, as shown in FIGS. 1 to 5.

The advantageous, convenient, and efficient alignment features of the present invention can be applied to a desktop computer or other type of computer, in order to prevent damage to a connector pin part of a hard disk drive when that hard disk drive is being electrically connected to a main board of the desktop computer or other type of computer.

The advantageous, convenient, and efficient alignment features of the present invention can be applied to a component other than a hard disk drive, when that component has a connector pin part or corresponding mating connector, and that component is being inserted into and removed from a portable computer, a desktop computer, another type of computer, or another type of device. Thus, damage to a connector pin parts or other mating connectors can be prevented using the accommodating guide 71 and guide projection 77, as well as the other components related to the location guide part 70, in accordance with the principles of the present invention.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a casing being formed to include an accommodating unit;
   a main board being accommodated in said casing;
   a connector being electrically connected to said main board at said accommodating unit;
   an assembly unit including a connecting pin part detachably engaging with said connector at said accommodating unit when said assembly unit engages said accommodating unit;
   a guide projection including a projection part and a fixing part; and
   an accommodating guide, said guide projection being provided at one unit selected from among said assembly unit and said accommodating unit, said accommodating guide being provided at said assembly unit when said guide projection is provided at said accommodating unit, said accommodating guide being provided at said accommodating unit when said guide projection is provided at said assembly unit, said accommodating guide engaging with said guide projection when said assembly unit engages said accommodating unit;
   said assembly unit further comprising:
   a support supporting a hard disk drive, said accommodating guide being mounted on said support and extending outward from a wall of said support when said guide projection is provided at said hard disk drive accommodating unit;
   when said assembly unit is inserted into said accommodating unit to install said assembly unit in said casing, said guide projection engaging said accommodating guide before said connecting pin part engages said connector.

2. The apparatus of claim 1, said assembly unit sliding into said accommodating unit when said assembly unit engages with said accommodating unit.

3. The apparatus of claim 2, when said assembly unit engages said accommodating part, said guide projection and said accommodating guide being adjacent to said connector, and said connector pin part being aligned with said connector.

4. The apparatus of claim 2, when said accommodating guide engages said guide projection, said connecting pin part being closely aligned with said connector before said connecting pin part engages with said connector.

5. The apparatus of claim 4, when said assembly unit engages said accommodating part, said guide projection and said accommodating guide being located adjacent to said connector.

6. The apparatus of claim 5, said assembly unit being a hard disk drive assembly unit, said casing being to a casing of a portable computer, said accommodating unit being a hard disk drive accommodating unit.

7. The apparatus of claim 1, said assembly unit sliding into said accommodating unit when said connecting pin part engages with said connector.

8. The apparatus of claim 1, when said assembly unit engages said accommodating part, said guide projection and said accommodating guide being adjacent to said connector, and said connector pin part being aligned with said connector.

9. The apparatus of claim 1, said accommodating guide forming an accommodating hole extending outward from the wall of said support, the accommodating hole engaging said guide projection before said connecting pin part engages said connector.

10. A portable computer apparatus, comprising:
   a casing being formed to include a hard disk drive accommodating unit;
   a main board being accommodated in said casing;
   a hard disk drive connector being electrically connected to said main board at said hard disk drive accommodating unit;
   hard disk drive assembly unit including a connecting pin part detachably engaging with said hard disk drive connector at said hard disk drive accommodating unit when said hard disk drive assembly unit engages said hard disk drive accommodating unit; and
   a location guide part, comprising:
      a guide projection including a projection part and a fixing part; and
      an accommodating guide, said guide projection being provided at one unit selected from among said hard disk drive assembly unit and said hard disk drive accommodating unit, said accommodating guide being provided at said hard disk drive assembly unit when said guide projection is provided at said hard disk drive accommodating unit, said accommodating guide being provided at said hard disk drive accommodating unit when said guide projection is provided at said hard disk drive assembly unit, said accommodating guide engaging with said guide projection when said hard disk drive assembly unit engages said hard disk drive accommodating unit,
   said hard disk drive assembly unit further comprising:
   a support supporting a hard disk drive;
   said accommodating guide being mounted on said support and extending outward from a wall of said support;
   when said hard disk drive assembly unit is inserted into said hard disk drive accommodating unit to install said hard disk drive assembly unit in said casing, said guide projection engaging said accommodating guide before said connecting pin part engages said hard disk drive connector.

11. The apparatus of claim 10, said accommodating guide forming an accommodating hole extending outward from the wall of said support, the accommodating hole engaging said guide projection before said connecting pin part engages said hard disk drive connector.

12. The apparatus of claim 11, the end of said accommodating hole extending outward from the wall of said support is formed with an inclined surface so that the projection part can be inserted smoothly.

13. A method, comprising:
   inserting an assembly unit into an accommodating unit formed by a casing, said assembly unit including a connecting pin part, said accommodating unit including a connector electrically connected to a main board accommodated in said casing;
   when said inserting is performed, engaging a guide projection with an accommodating guide, said guide projection being provided at one unit selected from among said assembly unit and said accommodating unit, said accommodating guide being provided at said assembly unit when said guide projection is provided at said accommodating unit, said accommodating guide being provided at said accommodating unit when said guide projection is provided at said assembly unit, said accommodating guide being engaged with said guide projection when said assembly unit is inserted into said accommodating part; and
   engaging said connecting pin part with said connector after said engaging of said guide projection with said accommodating guide,
   said accommodating guide being mounted on said assembly unit and extending outward from a wall of said assembly unit, said accommodating guide forming an accommodating hole extending outward from the wall of said support, the accommodating hole engaging said guide projection before said connecting pin part engages said connector.

14. A portable computer apparatus, comprising:
   a casing being formed to include a hard disk drive accommodating unit;
   a main board being accommodated in said casing;
   a hard disk drive connector being electrically connected to said main board at said hard disk drive accommodating unit;
   a hard disk drive assembly unit including a connecting pin part detachably engaging with said hard disk drive connector at said hard disk drive accommodating unit when said hard disk drive assembly unit engages said hard disk drive accommodating unit; and
   a location guide part, comprising:
      a guide projection including a projection part and a fixing part; and
      an accommodating guide, said guide projection being provided at one unit selected from among said hard disk drive assembly unit and said hard disk drive accommodating unit, said accommodating guide being provided at said hard disk drive assembly unit when said guide projection is provided at said hard disk drive accommodating unit, said accommodating guide being provided at said hard disk drive accommodating unit when said guide projection is provided at said hard disk drive assembly unit, said accommodating guide engaging with said guide projection when said hard disk drive assembly unit engages said hard disk drive accommodating unit,
   said guide projection is coupled to the main board by using a fastening unit.

* * * * *